United States Patent
Sugita

(10) Patent No.: US 6,705,810 B1
(45) Date of Patent: Mar. 16, 2004

(54) GUIDE DEVICE

(76) Inventor: Toyohisa Sugita, 3-73 Hara-machi, Shinjuku, Tokyo (JP), 162-0053

( * ) Notice: Subject to any disclaimer, the term of this patent is extended or adjusted under 35 U.S.C. 154(b) by 0 days.

(21) Appl. No.: 10/300,605

(22) Filed: Nov. 18, 2002

(51) Int. Cl.[7] ................................................ B23C 1/20
(52) U.S. Cl. ................................... 409/178; 144/137
(58) Field of Search .............................. 409/180, 178, 409/182, 181, 175, 177; 144/136.95, 137, 154.5, 144.1, 371

(56) References Cited

U.S. PATENT DOCUMENTS

| | | | | |
|---|---|---|---|---|
| 3,782,431 A | * | 1/1974 | Cox | 144/154.5 |
| 3,967,665 A | * | 7/1976 | Lund | 144/371 |
| 4,735,531 A | * | 4/1988 | Boerckel et al. | 409/182 |
| 4,770,216 A | * | 9/1988 | Ruscak | 144/144.1 |
| 4,966,507 A | * | 10/1990 | Hanks | 409/178 |
| 5,203,389 A | * | 4/1993 | Goodwin | 409/182 |
| 5,240,052 A | * | 8/1993 | Davison | 144/137 |
| 5,325,899 A | * | 7/1994 | Kochling | 144/144.1 |
| 5,472,029 A | * | 12/1995 | Ketch | 144/371 |
| 5,533,556 A | * | 7/1996 | Whitney | 144/144.1 |
| 5,738,470 A | * | 4/1998 | Sugita | 409/178 |
| 6,145,556 A | * | 11/2000 | Wood | 409/178 |
| 6,158,930 A | * | 12/2000 | Etter | 409/180 |

* cited by examiner

*Primary Examiner*—A. L. Wellington
*Assistant Examiner*—Dana Ross

(57) ABSTRACT

In a guide device for cutting a groove of this invention, a rectilinear guide member comprises a pair of guide members where the opening width between the guide members for an initial cut is set to be the same as the diameter of a router bit by inserting a pair of inserts between the guide members. A dado having a width that is the same as the thickness of a shelf board to be used is then formed by operating the router with a scrap piece of that board inserted between the guide members. A variety of inserts having various widths corresponding to popular router bit diameters may also be used.

6 Claims, 6 Drawing Sheets

PRIOR ART

GUIDE DEVICE

BACKGROUND OF THE INVENTION

1. Field of the Invention

This invention relates to an improved guide device for cutting a groove or dado with a router, and more particularly to novel improvements in a guide by which a groove having a width that is larger than the diameter of a rotary bit to be used and the same as the thickness of a board can be easily formed by first spreading, with inserts of a predetermined thickness, a rectilinear guide member by a width that is the same as the diameter of the rotary bit. By then inserting a chip or scrap piece of the board to be fitted such as for shelving in the guide after making the first cut, the device allows a groove having the same width as the board to be fitted therein to be easily formed by a second cut.

2. Description of the Related Art

The work of forming grooves or dados in side boards of a bookshelf, for example, and fitting shelf board to the grooves has been performed in several ways, as shown, for example in FIG. 1. First, a groove 2 is formed in a side board 1 by a rotary bit (not shown) of a router. Then, a shelf board 3 is brought into contact with the groove 2 and a position P corresponding to the thickness of the shelf board 3 is marked by a pencil. After that, the groove 2 is cut again by the router so that the groove width increases to the position P. This conventional method of forming a dado described above had the following problems. To form a dado whose width is substantially the same as the thickness of a shelf board, the extra width not covered by the initial cut must be measured and marked in some fashion. Then the router must be run along the groove again to cut the dado to the desired width. Therefore, the work is complicated and it is difficult to cut a number of dados with an accurate width for the specific board to be used in each dado. To solve this problem, particularly when forming grooves that are larger than the rotary bit to be used, a variety of techniques using clamps and guide boards or fences have been proposed, but all suffer from being very complicated and inaccurate.

To overcome these problems, the present inventor developed, as disclosed in U.S. Pat. No. 5,738,470, a novel guide device for cutting a dado by which a groove having a width that is larger than the diameter of a rotary bit to be used and the same as the thickness of a board can be easily formed by defining, in a rectilinear guide member, an opening or a through hole having a width that is the same as the diameter of the rotary bit. By inserting a chip or scrap piece of the board to be fitted such as for shelving in the opening after making a first cut, the device allows a groove having the same width as the board to be fitted therein to be easily formed by a second cut. In this invention, a guide device for cutting a groove is provided which includes a rectilinear guide member for guiding a router provided with a rotary bit having a predetermined diameter, the rectilinear guide member comprising a pair of first and second guide members connected to be freely slidable in relation to each other and an opening formed between said guide members when they are in contact with each other having a width equal to a diameter of the rotary bit.

However, during development, the present inventor found a number of problems with this guide that made it very difficult to produce on a large scale at a cost acceptable to both professional and amateur woodworkers. One of the major problems involved the opening or through hole, which involves a variety of machining steps when the guide is made of a metal or a complicated mold when the guide is made of a plastic. It was also found that a through hole required that the guide be made of an initially thicker piece of material, so that after the through hole was machined, etc., the guide would still have enough strength to withstand use under relatively severe conditions while still possessing acceptable accuracy. This made the guide both bulky and relatively heavy. After numerous attempts to solve the above problem, he developed a number of designs that would allow more flexibility during use, even greater accuracy and increased strength, all of which required less complicated machining and a more efficient use of materials.

SUMMARY OF THE INVENTION

The present invention has been made with a view to solve the problems stated above and its object is to provide an improved guide device for cutting dados and more particularly to a novel improvement by which dados can be accurately and easily formed by using inserts of a predetermined thickness to replace the role of the opening or through hole in the previous guide.

According to this invention, a guide device for cutting a groove is provided which includes a rectilinear guide member for guiding a router provided with a rotary bit having a predetermined diameter, said guide member comprising a pair of first and second guide members which are connected to be freely slidable in relation to each other and which are urged into a normally closed state by at least one elastic band running through both the first and second guide members, and a set of inserts of at least one predetermined thickness, said inserts being inserted to spread the guide member by a width equal to a diameter of the rotary bit.

DESCRIPTION OF THE PREFERRED EMBODIMENTS

Figure 1:
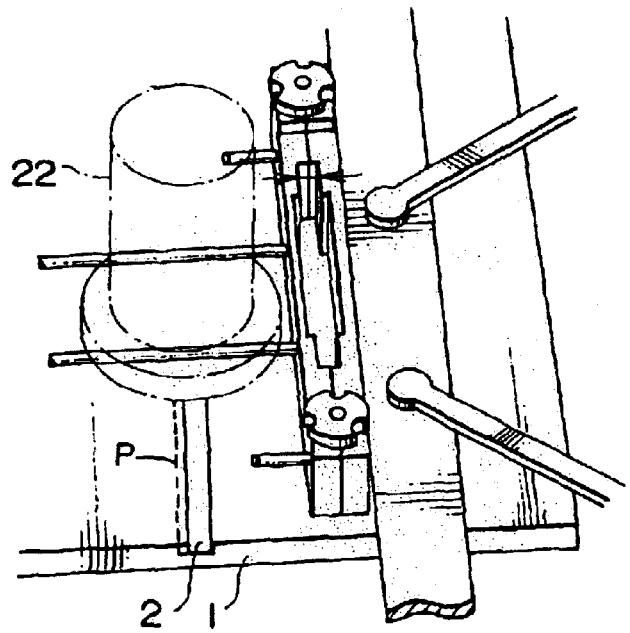
FIG. 1 is an explanatory view describing a prior method of cutting a dado.
Figure 2:
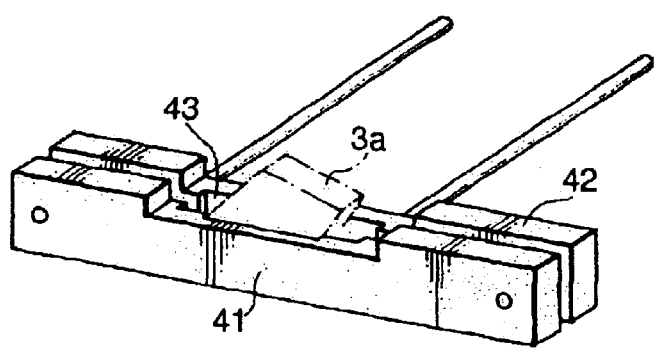
FIG. 2 is a perspective view for explaining a method of cutting a groove or dado using the previous invention of the present inventor

Preferred embodiments of a guide device for cutting a dado according to this invention will be described hereunder with reference to the drawings. Note that the same components as in FIG. 2 showing the prior art are denoted by the same reference numerals.

Figure 3:
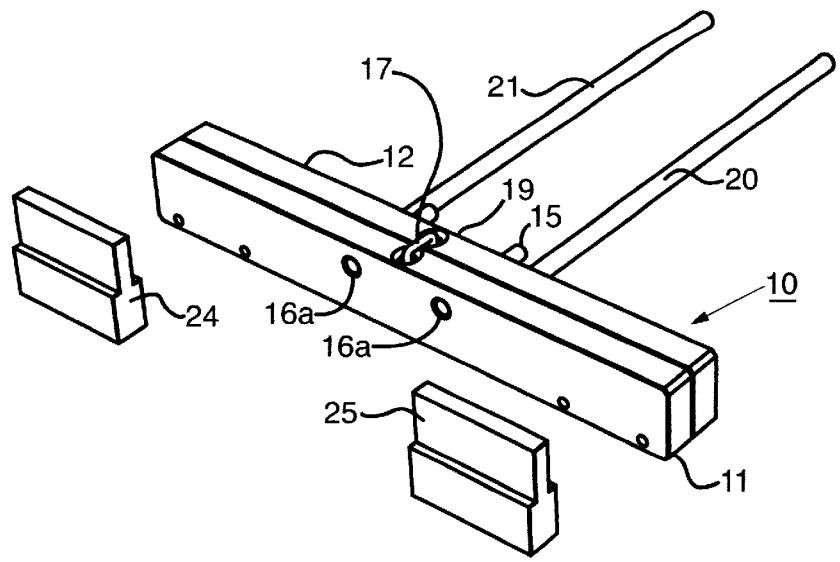
FIG. 3 is a perspective view of a principal portion of the present device part, the view also showing a set of inserts.
Figure 6:
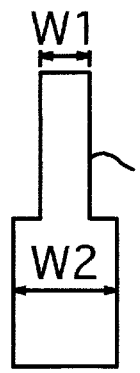
FIG. 6 is a plan view of one embodiment of one of the inserts of the present device.
Figure 7A:
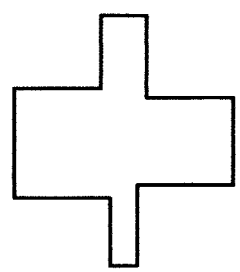
FIGS. 7A and 7B are plan views of another configuration of the inserts of the present device.
Figure 7B:
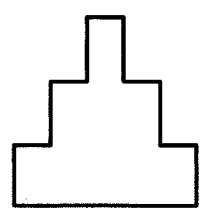

In FIG. 3, 10 denotes a rectilinear guide member comprising a pair of first and second guide members 11, 12 each of which has an elongate shape. A pair of guide pins 14, 15 appropriately spaced from each other are fixed in guide holes 16a (clearly shown in FIG. 14) in the first guide member 11 by suitable methods such as by press fitting, and a pair of guide holes 16b in the second guide member 12 are slidably fitted over each guide pin 14, 15 as shown in FIG. 6. In this way, the second guide member 12 is combined with the first guide member 11 through the guide pins 14, 15 such that the spacing D (FIG. 6) between both the guide members is freely adjustable.

In the previous invention, set bolts were threadably fitted into threaded holes at positions corresponding to the guide holes 16 of the second guide member 12 so that by turning the set bolts to press against the guide pins 14, 15, the guide members 11, 12 could be held in positions corresponding to a desired value of the spacing D. However, in the present invention an elastic band 17 is passed through a set of through holes 18, 19 formed in the guide members 11, 12 respectively. The elastic band urges the guide members 11, 12 together eliminating the need for such set bolts and the necessary threaded holes. A pair of guide shafts 20, 21 are fixedly provided on a side face of the second guide member 12 in a spaced relation from each other as in the previous invention.

Figure 5:
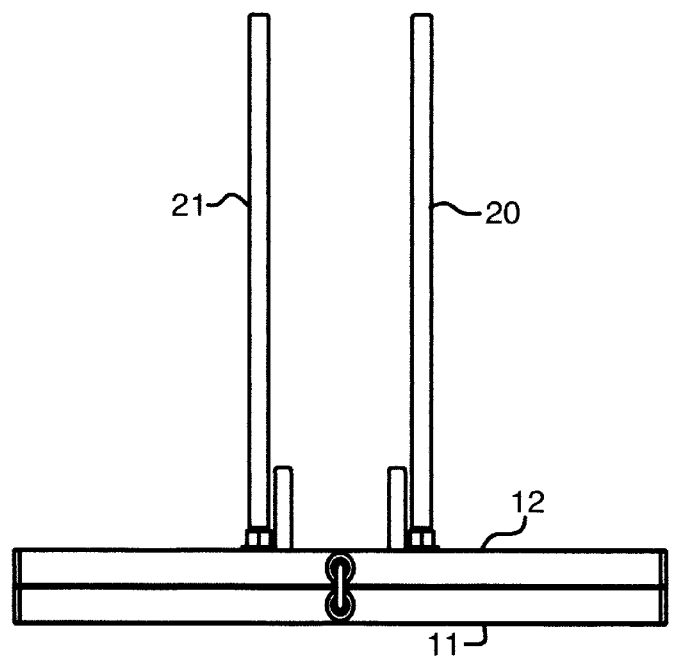
FIG. 5 is a plan view of a principal portion of the present device shown in FIG. 4.
Figure 8:
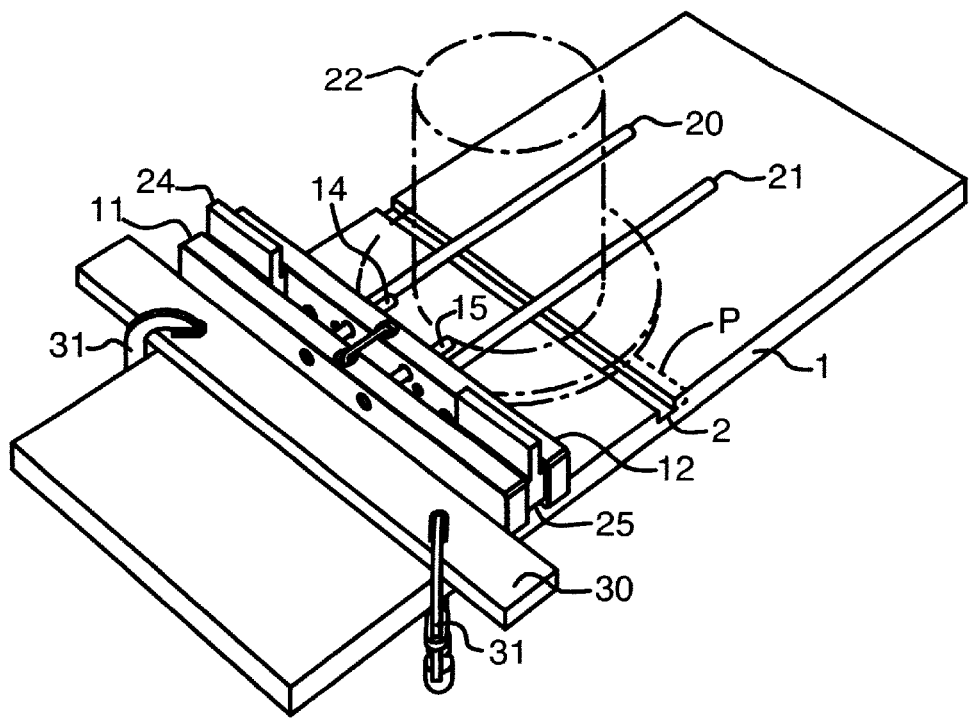
FIG. 8 is a perspective view for explaining a method of cutting a groove or dado using the present invention.
Figure 9:
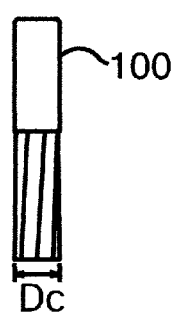
FIG. 9 is a side view of a rotary bit.

As can be seen from FIG. 5, there are no recesses or steps formed in the inner side faces of the guide members 11, 12, in contrast to the previous invention, so that there is no spacing D between the guide members 11, 12, i.e., the guide members 11, 12 are brought into full contact with each other. A spacing D is provided in the rectilinear guide member 10 by inserting stepped inserts 24, 25 in between the guide members 11,12 (as shown in FIG. 6). The spacing D can be first or second opening widths $W_1$, $W_2$ ($W_1 > W_2$), depending on which end of the inserts are inserted between the guide members 11, 12, and is measured in the widthwise direction B perpendicular to the longitudinal direction A of the guide members 11, 12. The opening widths $W_1$, $W_2$, as defined by the inserts (FIG. 8), are each selected to be the same as popular diameters (such as ¼ inch and ½ inch) of rotary or router bits (not shown) used in routers 22. However, this is only one example of the inserts 24, 25 as the inserts may be in other multi-stepped configurations such as shown in FIG. 9.

Figure 4:
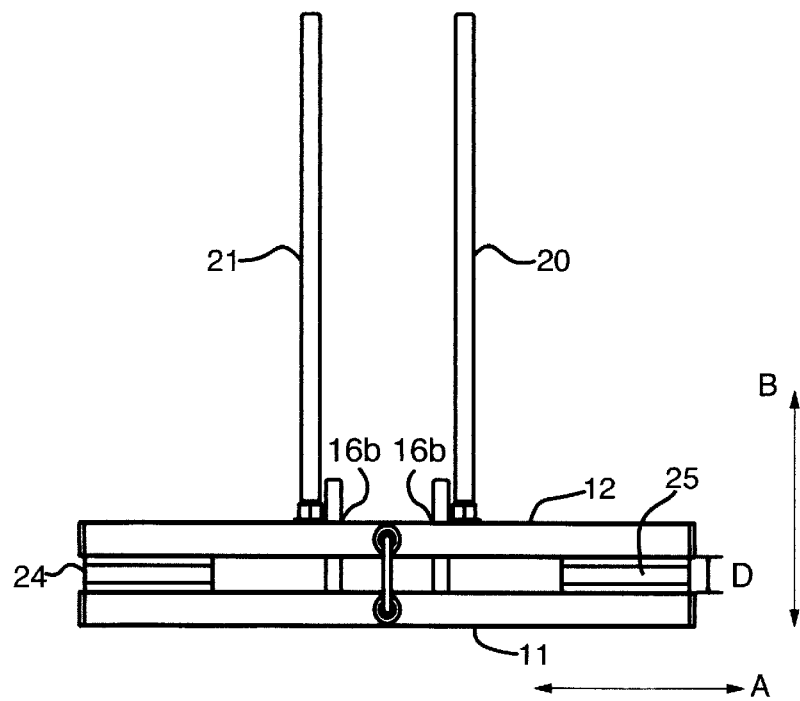
FIG. 4 is plan view of a principal portion of the present device wherein the set of inserts are inserted into the rectilinear guide member shown in FIG. 8.
Figure 10:
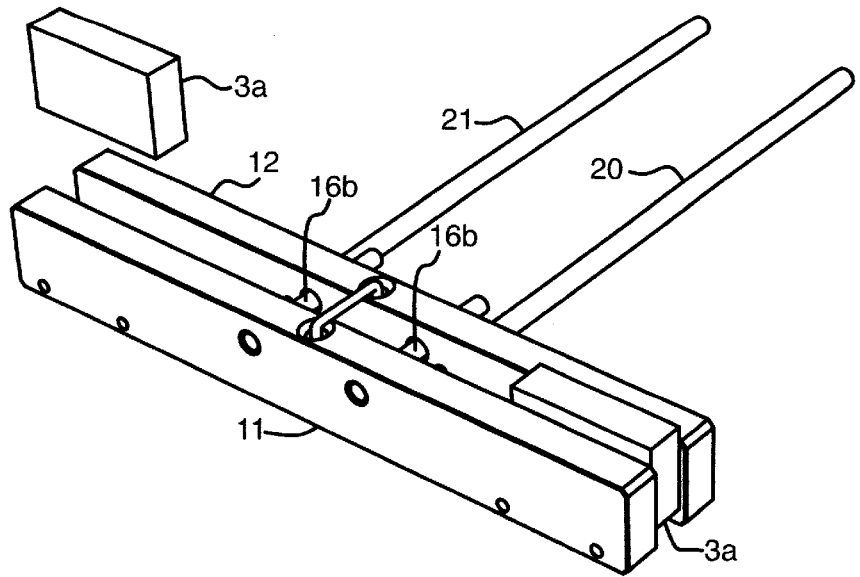
FIG. 10 is a perspective view of a principal portion of the present device, showing the use of the scrap pieces.

The operation will be described below. As shown in FIG. 4, the router 22 is first mounted on the guide shafts 20, 21 as is well known. Here, it goes without saying that the pair of guide shafts 20, 21 can be of various thicknesses in order to match the variety routers available. The guide shafts 20, 21 are fixedly provided on a side face of the second guide member and the rectilinear guide member 10 is then placed parallel to and in contact with a guide board 30 commonly known as a fence, which is secured onto a board 1 by fixing members 31 such as C-clamps. The opening width $W_1$ at this time is made to be the same as the diameter $D_c$ of the rotary bit 100 (FIG. 13) used in the router 22 by first inserting the appropriate widths of the inserts 24,25. Then, as shown in FIG. 4, a groove or dado 2 is formed by bringing the router 22 into contact, for example, with the rectilinear guide member 10 and moving it along the fence 30. With this operation, the groove 2 is formed to have a width that is the same as the diameter of the rotary bit 100. In order to increase the width of the dado 2 to that of the thickness of the particular board 3 to be used, two scrap pieces 3a of the board 3 are next inserted between the guide members 11, 12, in place of the inserts 24,25, as shown in FIG. 10. The insertion of the scrap pieces 3a makes the opening width WI equal to the thickness of the board 3. In other words, the router 22 mounted to the second guide member 12 of the rectilinear guide member 10 is moved to the left in FIG. 2 by the spacing D that is equal to the thickness of the board 3. By cutting the dado 2 again, that is, with a second cut by the router 22 under these conditions, the dado 2 will now have a width that is the same as the thickness of the scrap piece 3a (that is the board 3) indicated by the dotted lines in FIG. 4. Consequently, the board 3 can be accurately fitted into the groove 2. While two types of rotary bits are available in this embodiment corresponding to the opening widths $W_1$, $W_2$, three or more different diameter rotary bits can also be used by designing the inserts to have three or more stepped widths, as embodied by the inserts shown in FIG. 9.

Figure 11:
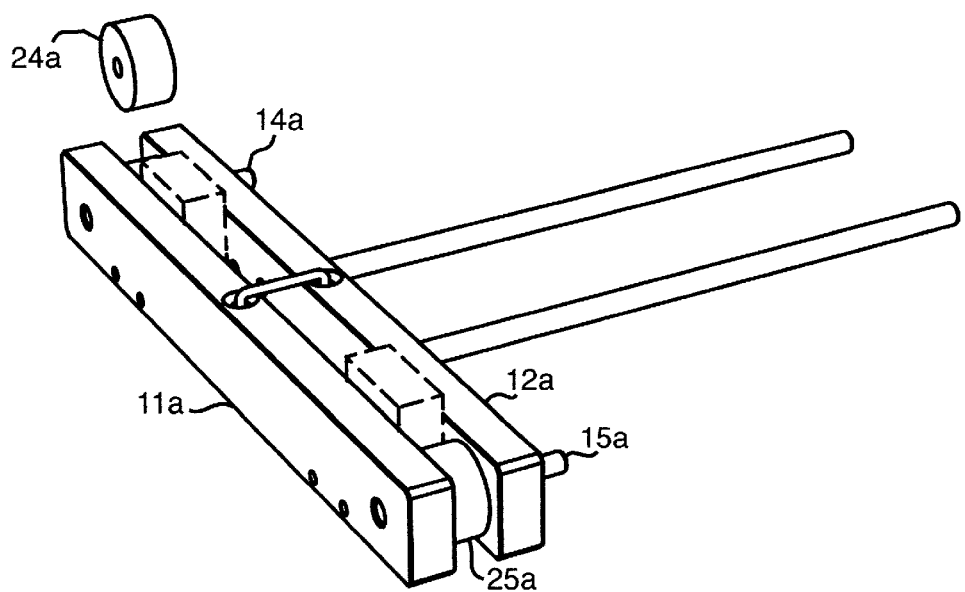
FIG. 11 is a plan view of another embodiment of the device in FIG. 3

In another embodiment of the present invention, as seen in FIG. 11, the guide pins are moved to the farther ends of the guide members 10, II and the inserts 24, 25 are formed in a cylindrical shape with a through hole passing through the center thereof With this construction, inserts of an appropriate thickness can be easily mounted on the guide pins between the guide members. In this fashion, since the inserts can remain mounted, a number of cuts can be made with a single diameter router bit without having to exchange the inserts with scrap pieces for each dado cut. This reduces the steps needed for each dado, a feature that is convenient when a large number of similar dados are being cut. Also, different size router bits can be used by just providing a variety of such round inserts in appropriate thicknesses.

Figure 12:
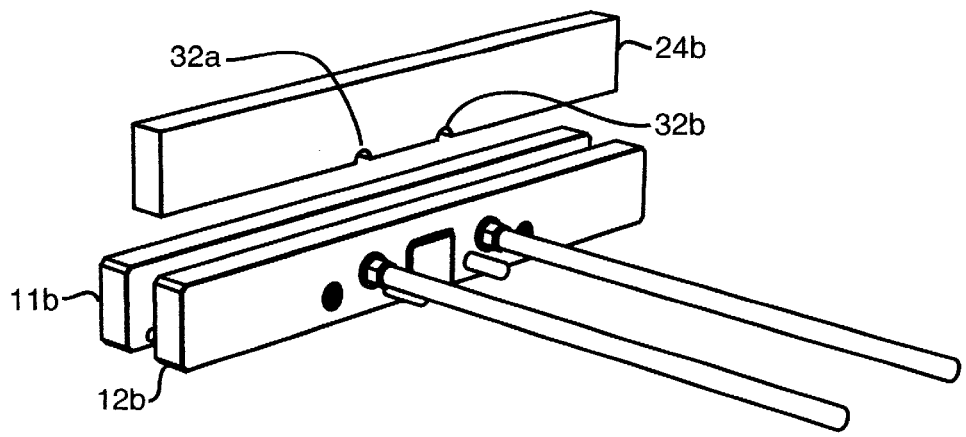
FIG. 12 is a side view of another embodiment of the device in FIG. 3.
Figure 14:
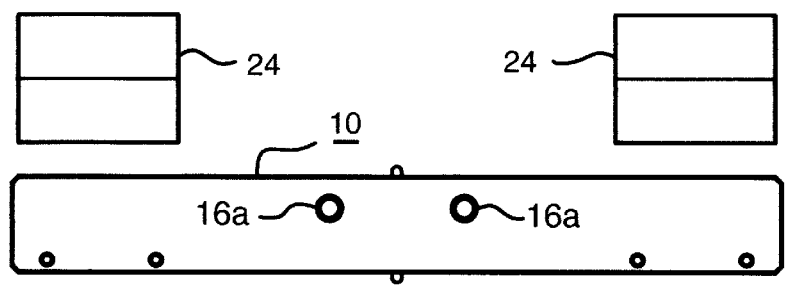
FIG. 14 is a back view of the device exemplifying the positions of holes for mounting guide pins

In a further embodiment as seen in FIG. 12, the inserts are replaced by a single one piece insert 24a. This insert has two semi-cylindrical cuts 32a, 32b on the bottom thereof as will be explained below. Specifically, in order to use such a one piece insert, the band 17 cannot be conveniently used as in the first embodiment and so the band has been modified to run in a use shaped fashion below the both guide members 11, 12 as seen in FIG. 14. The cuts on the bottom of the insert are provided to accommodate the band 17 so that the guide can move smoothly along a work surface.

Figure 13:
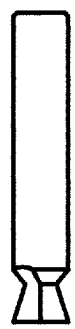
FIG. 13 is a side view of another rotary bit.
Figure 15:
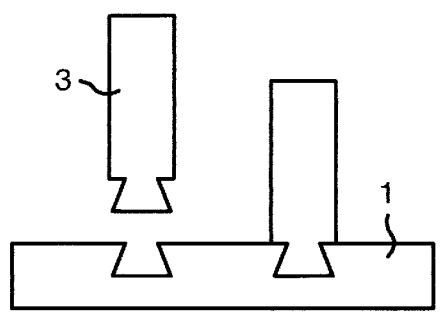
FIG. 15 is a side view of a dovetail cut.

Finally, the shape of the rotary bit 100 that may be used with the guide of the present invention is not limited to that shown in FIG. 12, but may also be in a shape as shown in FIG. 13 for example such as for cutting sliding dovetail grooves or dadoes. In this case, the diameter $D_c$ of the rotary bit is as large as the cutting portion of the bit itself, so that an appropriate dado can be cut as seen in FIG. 15.

According to this invention, since the guide device for cutting a dado is constructed as described above, the following advantages can be obtained. Since the rectilinear guide members are to be used with the inserts in lieu of the opening of various widths in the previous invention, manufacturing is remarkably facilitated without losing any of the advantages of the previous design. Specifically, the guide members only require a few steps to provide the through holes for the elastic band, the holes for the guide pins and the holes for the guide shafts. The contact surfaces between the guide members can also be easily machined with high accuracy, contributing to even more precise dadoing, etc.

Further, with this simplified design, the placement of the inserts is not limited and they can be placed with flexibility to meet various woodworking situations.

Another advantage of the present invention is the increased strength inherent in the simplified design of the guide members. This allows not only a reduction in the material required to maintain the strength necessary for providing a durable long lasting tool to a craftsman, but also permits the greater use of materials other than metals. That is, materials such as plastic, fiber reinforced plastic, etc., can be used as long as robustness and durability in the workplace environment are an essential part of the design process. These advantages make it possible to reduce manufacturing and shipping costs, making it easier to provide the guide device at a price that is reasonable to a greater number of craftsmen.

A further advantage of the present invention is the use of inserts. As mentioned before, the inserts can provide one, two or more steps or widths to be used with the variety of popular router bits available, such as ¼", ⅜", ½", ⅝", ¾", etc. For example, with the inserts with two steps, when a shelf board thickness is ¼" to ½", the upper thin portion of the insert is used along with a ¼" bit, and when the thickness is ½" to 1 ½" the lower thick portion is used with a ½ router bit.

By selecting a rotary bit having the same diameter as one of the widths of the inserts for example, and making the preliminary cut, the distance by which the rotary bit is to be moved in the next cut to achieve a desired dado width can then be accurately set just by inserting a scrap piece of the board to be used in between the guide members. It is thus possible to simply and accurately form a dado having a width that is the same as the thickness of the shelving to be used. As the cut with this device is so accurate, the fit between the board and the dado is tight enough to make insertion during slightly difficult. However, this can be easily solved by the mere insertion of a thin piece of paper between the scrap piece 3a and the guide, to facilitate insertion without markedly reducing the inherent accurate fit.

Additionally, with the second embodiment, projects requiring a large number of similar dados can be carried out with a reduced number of steps, greatly facilitating the completion of large projects without reducing the flexibility inherent in the basic design of the guide.

Further, with the single insert of the third embodiment, the same bar stock can be used to manufacture the guide members and the insert, reducing manufacturing steps and cost. The single insert also provides a slightly more stable fit with the guide members, providing a small increase in accuracy.

What is claimed is:

1. A guide device for cutting a groove which includes a rectilinear guide member (10) for guiding a router (22) provided with a rotary bit (100) having a predetermined diameter, wherein said rectilinear guide member (10) comprises a pair of first and second guide members (11, 12) which are connected to be freely slidable in relation to each other and at least one insert (24,25) for insertion between said first and second guide members having at least one width (W1) equal to a multiple of a diameter ($D_c$) of said rotary bit (100), said first and second guide members being urged to fit snugly upon said inserts by a continuous band (17) running through both the first and second guide members.

2. A guide device for cutting a groove according to claim 1, wherein said at least one insert (24,25) has a plurality of widths formed to have opposite faces that are to contact the first and second guide members upon insertion therein.

3. A guide device for cutting a groove according to claim 2, wherein the plurality of widths of said at least one insert (24,25) are ¼" and ½" respectively.

4. A guide device for cutting a groove according to claim 1, wherein each of said first and second guide members (11,12) are connected through guide pins (14,15).

5. A guide device for cutting a groove according to claim 1, wherein said guide pins are moved to farther ends of the first and second guide members (11,12) and the at least one insert (24,25) is formed in a cylindrical shape with a through hole passing through the center thereof, the at least one insert being mountable on said guide pins.

6. A guide device for cutting a groove according to claim 1, wherein said at least one insert (24,25) is a single unitary insert (24a) of a length less than said guide members (11,12).

* * * * *